(12) United States Patent
Fukuman et al.

(10) Patent No.: US 10,175,354 B2
(45) Date of Patent: *Jan. 8, 2019

(54) OBJECT DETECTION APPARATUS

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Masumi Fukuman, Kariya (JP); Motonari Ohbayashi, Nagakute (JP); Akihiro Kida, Toyota (JP)

(73) Assignees: DENSO CORPORATION, Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 285 days.

This patent is subject to a terminal disclaimer.

(21) Appl. No.: 14/887,623

(22) Filed: Oct. 20, 2015

(65) Prior Publication Data

US 2016/0116441 A1    Apr. 28, 2016

(30) Foreign Application Priority Data

Oct. 22, 2014  (JP) .................................. 2014-215098

(51) Int. Cl.
*G01N 29/07* (2006.01)
*G01S 15/87* (2006.01)
(Continued)

(52) U.S. Cl.
CPC ............ *G01S 15/878* (2013.01); *G01S 7/527* (2013.01); *G01S 15/46* (2013.01); *G01S 15/931* (2013.01);
(Continued)

(58) Field of Classification Search
CPC . G01L 5/0038; G01L 1/18; G01L 1/20; F16B 31/028
(Continued)

(56) References Cited

U.S. PATENT DOCUMENTS 3,418,325 A    12/1968 Nigel
3,418,625 A    12/1968 Nigel
(Continued)

FOREIGN PATENT DOCUMENTS

CN    103605125    2/2014
JP    S63127179    5/1988
(Continued)

OTHER PUBLICATIONS

U.S. Appl. No. 14/880,526, dated Oct. 12, 2015, Fukuman, et al.
(Continued)

*Primary Examiner* — Natalie Huls
*Assistant Examiner* — Monica S Young
(74) *Attorney, Agent, or Firm* — Knobbe, Martens, Olson & Bear, LLP (57) ABSTRACT

An object detection apparatus for detecting objects around the apparatus by transmitting a probe wave and receiving reflections from the objects. If it is determined that both first and second object positions can be calculated using a combination of first direct and indirect waves and a combination of second direct and indirect waves, respectively, and at least one of third and fourth object positions can be calculated using a combination of the second direct wave and the first indirect wave and a combination of the first direct wave and the second indirect wave, only the first object position is calculated. The second direct wave is received at a first location after receipt of the first direct wave at the first location. The second indirect wave is
(Continued)

received at a second location away from the first location after receipt of the first indirect wave at the second location.

6 Claims, 4 Drawing Sheets

(51) Int. Cl.
  *G01S 15/93* (2006.01)
  *G01S 7/527* (2006.01)
  *G01S 15/46* (2006.01)
(52) U.S. Cl.
  CPC ... *G01S 2015/465* (2013.01); *G01S 2015/938* (2013.01)
(58) Field of Classification Search
  USPC .......................................................... 73/597
  See application file for complete search history.

(56) References Cited

U.S. PATENT DOCUMENTS

| | | | |
|---|---|---|---|
| 5,122,990 | A | 6/1992 | Deines |
| 5,315,562 | A | 5/1994 | Bradley |
| 5,689,250 | A | 11/1997 | Kremser |
| 5,761,155 | A | 6/1998 | Eccardt et al. |
| 5,923,282 | A | 7/1999 | Honma et al. |
| 5,940,011 | A | 8/1999 | Agravante et al. |
| 6,289,282 | B1 | 9/2001 | Hassler et al. |
| 6,434,486 | B1 | 8/2002 | Studt |
| 6,898,528 | B2 | 5/2005 | Zorka |
| 7,068,155 | B2 | 6/2006 | Kade |
| 7,202,776 | B2 | 4/2007 | Breed |
| 7,873,181 | B1 | 1/2011 | Maluf |
| 8,108,147 | B1 | 1/2012 | Blackburn |
| 8,452,506 | B2 | 5/2013 | Groult |
| 8,605,947 | B2 | 12/2013 | Zhang et al. |
| 8,989,944 | B1 | 3/2015 | Agarwal et al. |
| 9,221,396 | B1 | 12/2015 | Zhu et al. |
| 9,507,023 | B2 | 11/2016 | Nakano |
| 9,541,644 | B2 | 1/2017 | Hoenes et al. |
| 2002/0047780 | A1* | 4/2002 | Nishimoto .......... G01S 7/52004 340/540 |
| 2003/0195704 | A1 | 10/2003 | Sekiguchi |
| 2004/0238249 | A1 | 12/2004 | Kim |
| 2005/0046606 | A1 | 3/2005 | Yoneda |
| 2005/0195071 | A1 | 9/2005 | Ewerhart et al. |
| 2006/0031015 | A1 | 2/2006 | Paradie |
| 2006/0085177 | A1 | 4/2006 | Toyama et al. |
| 2006/0119473 | A1* | 6/2006 | Gunderson ............ B60Q 9/006 340/435 |
| 2007/0176822 | A1 | 8/2007 | Shirakawa |
| 2008/0068146 | A1 | 3/2008 | Cauldwell |
| 2008/0204208 | A1 | 8/2008 | Kawamata et al. |
| 2009/0299662 | A1 | 12/2009 | Fehrenbach |
| 2010/0214872 | A1 | 8/2010 | Schmid et al. |
| 2011/0044507 | A1 | 2/2011 | Strauss et al. |
| 2011/0133917 | A1 | 6/2011 | Zeng |
| 2011/0241857 | A1 | 10/2011 | Brandenburger et al. |
| 2012/0307594 | A1* | 12/2012 | Inoue .................. G01S 7/52004 367/99 |
| 2014/0340993 | A1 | 11/2014 | Honda |
| 2015/0097704 | A1* | 4/2015 | Kwon .................... B60Q 9/006 340/932.2 |
| 2015/0310281 | A1 | 10/2015 | Zhu et al. |
| 2016/0253575 | A1 | 9/2016 | Kakegawa et al. |
| 2017/0261602 | A1 | 9/2017 | Olshansky et al. |

FOREIGN PATENT DOCUMENTS

| | | |
|---|---|---|
| JP | H06-138225 | 5/1994 |
| JP | H06-150195 | 5/1994 |
| JP | 2005-070943 | 3/2005 |
| JP | 2008-039497 | 2/2008 |
| JP | 2008-122137 | 5/2008 |
| JP | 2013-124982 | 6/2013 |
| JP | 2014-089077 | 5/2014 |
| JP | 2014-089077 A | 5/2014 |
| JP | 2014-093039 | 5/2014 |
| JP | 2015-004562 | 1/2015 |
| KR | 20130119674 A * | 11/2013 |
| WO | WO 2005/091015 | 9/2005 |

OTHER PUBLICATIONS

U.S. Appl. No. 14/918,330, dated Oct. 20, 2015, Fukuman, et al.
U.S. Appl. No. 14/887,625, dated Oct. 20, 2015, Fukuman, et al.
U.S. Appl. No. 14/918,319, dated Oct. 20, 2015, Fukuman, et al.
U.S. Appl. No. 14/918,373, dated Oct. 20, 2015, Fukuman, et al.
U.S. Appl. No. 14/918,920, dated Oct. 21, 2015, Fukuman, et al.
U.S. Appl. No. 14/919,498, dated Oct. 21, 2015, Fukuman, et al.
U.S. Appl. No. 14/919,562, dated Oct. 22, 2015, Fukuman, et al.
U.S. Appl. No. 14/880,526, 2016/0116585, dated Apr. 28, 2016.
U.S. Appl. No. 14/918,330, 2016/0116591, dated Apr. 28, 2016.
U.S. Appl. No. 14/887,625, 2016/0116583, dated Apr. 28, 2016.
U.S. Appl. No. 14/918,319, 2016/0116590, dated Apr. 28, 2016.
U.S. Appl. No. 14/918,373, 2016/0116586, dated Apr. 28, 2016.
U.S. Appl. No. 14/918,920, 2016/0117841, dated Apr. 28, 2016.
U.S. Appl. No. 14/919,498, U.S. Pat. No. 9,575,179, dated Feb. 21, 2017.
U.S. Appl. No. 14/919,562, 2016/0116588, dated Apr. 28, 2016.
U.S. Appl. No. 14/880,526, filed Oct. 12, 2015, Fukuman, et al.
U.S. Appl. No. 14/918,330, filed Oct. 20, 2015, Fukuman, et al.
U.S. Appl. No. 14/887,625, filed Oct. 20, 2015, Fukuman, et al.
U.S. Appl. No. 14/918,319, filed Oct. 20, 2015, Fukuman, et al.
U.S. Appl. No. 14/918,373, filed Oct. 20, 2015, Fukuman, et al.
U.S. Appl. No. 14/918,920, filed Oct. 21, 2015, Fukuman, et al.
U.S. Appl. No. 14/919,498, filed Oct. 21, 2015, Fukuman, et al.
U.S. Appl. No. 14/919,562, filed Oct. 21, 2015, Fukuman, et al.
United States Patent and Trademark Office, Advisory Action, U.S. Appl. No. 14/880,526, dated May 25, 2018, in 4 pages.
United States Patent and Trademark Office, Final Office Action, U.S. Appl. No. 14/918,319, dated Jul. 19, 2018 in 12 pages.
Tian Fenxia, "Pipeline Obstacle Detecting and Locating Based on Ultrasonic Waves", Southwest Jiaotong Postraduate Dissertation, Jun. 2013, TP391, p. 30.
Notice of Allowance and Fee(s) Due, U.S. Appl. No. 14/919,562, dated Aug. 1, 2018, in 11 pages.
Notice of Allowance and Fee(s) Due, U.S. Appl. No. 14/918,920, dated Jun. 11, 2018, in 11 pages.
Chinese document, "The Basic Characteristics of a Multiple Echo", in 8 pages.
"Study on Airborne Ultrasonic Position and Velocity Measurement of Multiple Objects Using Chirp Signal", by Sakai Ko, Kurosawa Minoru, Hirata Shinnosuke (Tokyo Institute of Technology), Orino Yuichiro (The University of Shiga Prefecture), Acoustical Society of Japan Spring Meeting, Mar. 2013, p. 1451-1452, in 4 pages.
Installation and Operation of Ship Navigation System, Beijing Institute of Technology Press, dated Aug. 2014 in 8 pages.
United States Patent and Trademark Office, Office Action, U.S. Appl. No. 14/880,526, dated Jul. 6, 2017 in 12 pages.
United States Patent and Trademark Office, Final Office Action, U.S. Appl. No. 14/880,526, dated Feb. 28, 2018 in 11 pages.
United States Patent and Trademark Office, Office Action, U.S. Appl. No. 14/918,373, dated Dec. 19, 2017 in 13 pages.
United States Patent and Trademark Office, Final Office Action, U.S. Appl. No. 14/918,373, dated Apr. 9, 2018 in 9 pages.
United States Patent and Trademark Office, Office Action, U.S. Appl. No. 14/918,330, dated Oct. 20, 2017 in 13 pages.
United States Patent and Trademark Office, Final Office Action, U.S. Appl. No. 14/918,330, dated Mar. 12, 2018 in 11 pages.
United States Patent and Trademark Office, Office Action, U.S. Appl. No. 14/918,319, dated Sep. 5, 2017 in 13 pages.
United States Patent and Trademark Office, Final Office Action, U.S. Appl. No. 14/918,319, dated Feb. 28, 2018 in 12 pages.
United States Patent and Trademark Office, Office Action, U.S. Appl. No. 14/918,920, dated Feb. 23, 2017 in 13 pages.

(56) References Cited

OTHER PUBLICATIONS

United States Patent and Trademark Office, Office Action, U.S. Appl. No. 14/918,920, dated Dec. 15, 2017 in 13 pages.
United States Patent and Trademark Office, Office Action, U.S. Appl. No. 14/919,562, dated Sep. 12, 2017 in 14 pages.
United States Patent and Trademark Office, Final Office Action, U.S. Appl. No. 14/919,562, dated Mar. 29, 2018 in 12 pages.
United States Patent and Trademark Office, Office Action, U.S. Appl. No. 14/887,625, dated May 10, 2018 in 26 pages.
United States Patent and Trademark Office, Notice of Allowance, U.S. Appl. No. 14/918,920, dated Apr. 11, 2018 in 7 pages.

\* cited by examiner

OBJECT DETECTION APPARATUS

CROSS-REFERENCE TO RELATED APPLICATION

This application is based on and claims the benefit of priority from earlier Japanese Patent Applications No. 2014-215098 filed Oct. 22, 2014, the descriptions of which are incorporated herein by reference.

BACKGROUND

Technical Field

The present invention relates to an object detection apparatus for detecting an object around a vehicle carrying the apparatus.

Related Art

Conventionally, a known object detection apparatus includes at least one ranging sensor, such as an ultrasonic sensor or the like, mounted in a vehicle to detect an object, such as a pedestrian, an obstacle or the like, around the vehicle, and based on detection results, performs various types of control, such as actuation of a braking device and notification to a driver, for improving vehicle driving safety.

If the object is not within a vehicle width in a widthwise or crossvehicle direction perpendicular to a traveling direction of the vehicle, the vehicle and the object are less likely to interact with or contact each other. However, a widthwise (or lateral) position of the object cannot be detected by measuring only a distance between the vehicle and the object. Therefore, if only a distance between the vehicle and the object is detected, it may be determined that the vehicle and the object are likely to interact with each other even in the absence of the object within the vehicle width, which may cause actuation of the braking device or notification to the driver.

To solve such a problem, an object detection apparatus disclosed in Japanese Patent Application Laid-Open Publication No. 2014-89077 is configured to detect a widthwise position of an object forward of the vehicle. This object detection apparatus includes two ranging sensors mounted in the vehicle to calculate the widthwise position of the object based on the principle of triangulation. If the widthwise position of the object is within the vehicle width, it is determined that the vehicle and the object are likely to interact with each other. If the widthwise position of the object is not within the vehicle width, it is determined that the vehicle and the object are less likely to interact with each other. Performing such an object detection process can prevent the actuation of the braking device in the absence of an object within the vehicle width.

In the object detection apparatus disclosed in Japanese Patent Application Laid-Open Publication No. 2014-89077, the number of objects that can be detected each time the above object detection process is performed is limited to one. In the presence of a plurality of objects forward of the vehicle, only the object closest to the vehicle is detected and no other objects farther away from the vehicle than the closest object can be detected. Then, if the closest object is not within the vehicle width and at least one of the other objects that is farther away from the vehicle than the closest object is within the vehicle width, the braking device may not be actuated.

In consideration of the foregoing, exemplary embodiments of the present invention are directed to providing an object detection apparatus capable of properly calculating positions of a plurality of objects.

SUMMARY

In accordance with an exemplary embodiment of the present invention, there is provided an object detection apparatus for detecting one or more objects around the apparatus by transmitting a probe wave and receiving reflections of the probe wave from the one or more objects. In the apparatus, a first direct-wave detector is configured to determine whether or not a first direct wave has been received as a reflection of the probe wave at a first location where the probe wave is transmitted, a second direct-wave detector is configured to determine whether or not a second direct wave has been received as a reflection of the probe wave at the first location at a time later than the receipt time of the first direct wave, a first indirect-wave detector is configured to determine whether or not a first indirect wave has been received as a reflection of the probe wave at a second location that is away from the first location, and a second indirect-wave detector is configured to determine whether or not a second indirect wave has been received as a reflection of the probe wave at the second location at a time later than the receipt time of the first indirect wave. Further, in the apparatus, a first determiner is configured to determine whether or not a first object position can be calculated using a combination of the first direct wave and the first indirect wave, a second determiner is configured to determine whether or not a second object position can be calculated using a combination of the second direct wave and the second indirect wave, a third determiner is configured to determine whether or not a third object position can be calculated using a combination of the second direct wave and the first indirect wave, and a fourth determiner is configured to determine whether or not a fourth object position can be calculated using a combination of the first direct wave and the second indirect wave. An object-position calculator is configured to, if it is determined from the determinations of the first to fourth determiners that both the first and second object positions can be calculated and at least one of the third and fourth object positions can be calculated, calculates only the first object position using the first direct wave and the first indirect wave.

When positions of first and second objects are detected using the first direct wave, the first indirect wave, the second direct wave, and the second indirect wave, the triangulation calculations for incorrect combinations of direct and indirect waves will provide positions of actually non-existent objects (i.e. ghosts). With the above configuration, in the presence of the second object farther away from the vehicle than the first object, the position of the second object can be calculated using the second direct wave and the second indirect wave. Further, positions of objects are calculated using combinations of direct and indirect waves other than combinations of direct and indirect waves for which the triangulation calculations may provide positions of actually non-existent objects (i.e., ghosts). This allows positions of actually existent objects to be calculated accurately without misdetecting positions of actually non-existent objects.

DESCRIPTION OF SPECIFIC EMBODIMENTS

Example embodiments will now be described more fully with reference to the accompanying drawings. Example embodiments are provided so that this disclosure will be thorough, and will fully convey the scope to those who are skilled in the art. Numerous specific details are set forth such as examples of specific components to provide a thorough understanding of embodiments of the present disclosure. It will be apparent to those skilled in the art that example embodiments may be embodied in many different forms and that neither should be construed to limit the scope of the disclosure. Identical or equivalent components or components of equal or equivalent action are thereby identified by the same or similar reference numerals.

An object detection apparatus mounted in a moving object in accordance with one embodiment of the present invention will now be explained with reference to the accompanying drawings. The object detection apparatus of the present embodiment is mounted in a vehicle as the moving object and is configured to receive object sensing information from ranging sensors mounted in the vehicle to detect an object around the vehicle, such as another vehicle, a roadway construction or the like. An object detection system in accordance with the present embodiment will now be explained with reference to FIG. 1A.

Figure 1A:
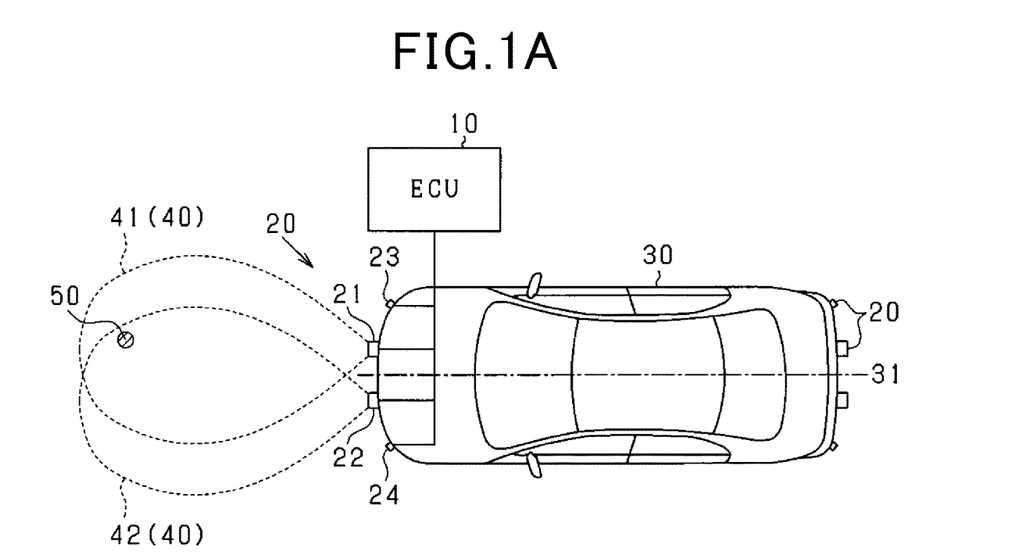
FIG. 1A is a schematic of an object detection system in accordance with one embodiment of the present invention.

Each of ranging sensors 20 may be an ultrasonic sensor having a function of transmitting an ultrasonic wave at a frequency in a range of 20-100 kHz as a probe wave and a function of receiving a reflection of the probe wave from an object. In the present embodiment, four ranging sensors 20 are attached to a front portion of the vehicle 30 (e.g., a front bumper) and spaced apart from each other by a predetermined spacing in a widthwise direction of the vehicle perpendicular to the traveling direction of the vehicle 30. More specifically, the ranging sensors 20 include two center sensors (first and second sensors 21, 22) in proximity to the center line 31 of the vehicle 30 and at symmetrical positions about the center line 31, and corner sensors 23, 24 at front left and right corners of the vehicle 30. Four more ranging sensor 20 are attached to a rear portion of the vehicle 30 (e.g., a rear bumper) at similar positions, therefore including two center sensors and two corner sensors. These rear ranging sensors attached to the rear portion of the vehicle 30 have the same functions as the ranging sensors attached to the front portion of the vehicle 30. Therefore, descriptions for the rear ranging sensors 20 will not be repeated below.

For each of the ranging sensors 20, the ranging sensor has a range of object detection 40 such that a reflection of the probe wave transmitted by the ranging sensor from an object within the range of object detection can be received by the ranging sensor. Any pair of adjacent ranging sensors 20 are attached to the front portion of the vehicle 30 so that the ranges of object detection 40 of the adjacent ranging sensors 20 at least partially overlap each other. Although only the ranges of object detection 40 of the first and second ranging sensors (center sensors) 21, 22 are shown in FIG. 1A, the corner sensors 23, 24 may also have similar ranges of object detection 40. Each of the ranging sensors 20 has a threshold value for amplitude of reflections. Upon receipt of the reflection having an amplitude equal to or greater than the threshold value, the ranging sensor 20 transmits object sensing information including a receipt time of the reflection to an electronic control unit (ECU) 10 as the object detection apparatus of the present embodiment.

The ECU 10 includes a microcomputer formed of CPU and various memories, such as RAM and ROM, and is configured to detect the object(s) 50 around the vehicle 30 based on the object sensing information of the object(s) 50 received from the ranging sensors 20. More specifically, the ECU 10 transmits control signals to at least one of the ranging sensors 20 every predetermined time interval (e.g., every hundreds of milliseconds) to instruct the ranging sensors 20 to transmit the probe wave.

Upon receipt of the object sensing information of the object 50 from the ranging sensors 20, the ECU 10 determines the presence or absence of the object 50 around the vehicle based on the received sensing information. When it is determined that the object 50 is present around the vehicle 30, then the ECU 10 performs a vehicle-object interaction avoidance control, such as a steering angle control or a deceleration control, or notification to a driver of the vehicle 30 using an audible alarm so that the vehicle 30 does not interact with the object 50.

The ECU 10 uses the object sensing information of the object 50 received from the ranging sensors 20 to calculate a position (i.e., coordinates) of the object 50 relative to the vehicle 30 (referred to as a relative position of the object 30) using the principle of triangulation. According to the well-known principle of triangulation, the coordinates of a measurement point are calculated using a known distance between two points and distances from the two points to the measurement point. According to such principle of triangulation, the ECU 10 calculates the relative position of the object 50 based on a known distance between two adjacent ranging sensors 20 whose ranges of object detection 40 at least partially overlap each other and measured distances from the two adjacent ranging sensors 20 to the object 50.

Figure 2:
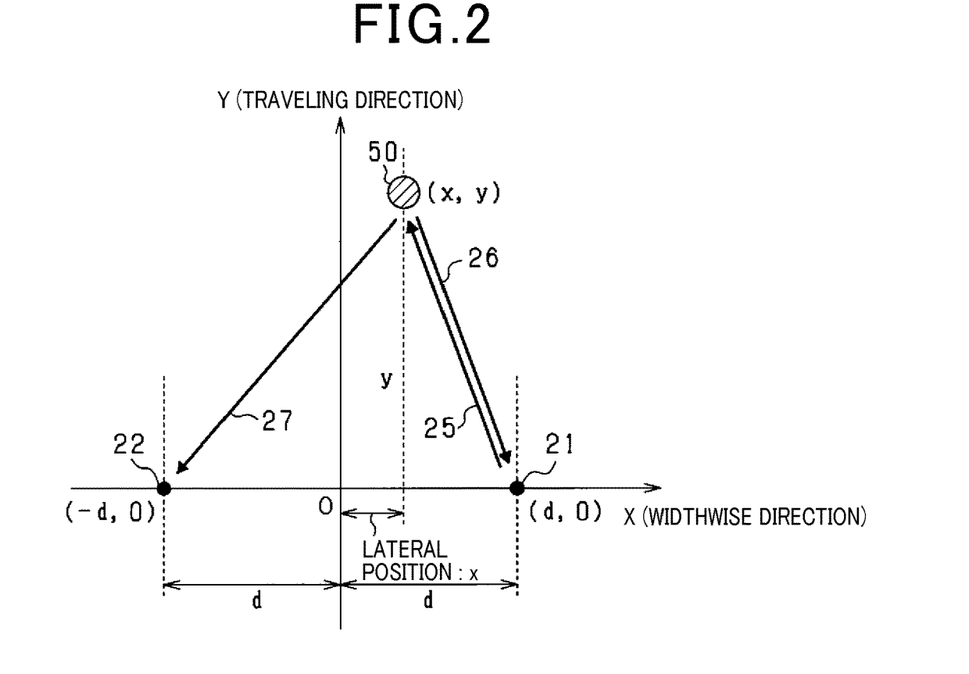
FIG. 2 is a schematic of calculating a position of an object by triangulation.

FIG. 2 is a schematic of calculating the relative position of the object 50, which shows the first and second sensors 21, 22 and the object 50 in front of the first and second sensors 21, 22 in plan view. In FIG. 2, the first sensor 21 serves as an active sensor configured to transmit a probe wave 25 and receive a direct wave 26 that is a reflection of the probe wave 25 at a first location, and the second sensor 22 serves as a passive sensor configured to only receive an indirect wave 27 that is a reflection of the probe wave 25 transmitted by the first sensor 21 at a second location away from the first location.

The ECU 10 calculates an estimated (relative) position of the object 50 specified by X- and Y-coordinates of the object 50 in a coordinate system defined by an X-axis being a straight line passing through the first and second sensors 21, 22 and a Y-axis being a straight line passing through a median between the first and second sensors 21, 22 and perpendicular to the X-axis. More specifically, in the present embodiment, the ECU 10 instructs the first sensor 21 to transmit the probe wave 25. When the first sensor 21 receives the direct wave 26 that is a reflection of the probe wave 25 from the object 50, the ECU 10 calculates a distance between the first sensor 21 and the object 50 based on the direct wave 26. When the second sensor 22 receives the indirect wave 27 that is a reflection of the probe wave 25 from the object 50, the ECU 10 calculates a distance between the second sensor 22 and the object 50 based on the indirect wave 27.

A distance between an origin O of the coordinate system at which the X-axis and the Y-axis intersect and the first sensor 21 is equal to a distance between the origin O and the second sensor 22, which distances are denoted by d and stored beforehand in the ECU 10. The ECU 10 calculates a first time t1 and a second time t2, where the first time t1 is the time the direct wave 26 is received by the first sensor 21 subtracted by the time the probe wave 25 is transmitted by the first sensor 21 and the second time t2 is the time the indirect wave 27 is received by the second sensor 22 subtracted by the time the probe wave 25 is transmitted by the first sensor 21. The first time t1 multiplied by the speed of sound is twice the distance between the first sensor 21 and the object 50. The second time t2 multiplied by the speed of sound is a sum of the distance between the first sensor 21 and the object 50 and a distance between the second sensor 22 and the object 50. The ECU 10 performs a triangulation calculation using the distance $2d$ between the first sensor 21 and the second sensor 22 and the first time t1 and the second time t2 to calculate the coordinates (X, Y) of the object 50.

In the present embodiment, FIG. 2 shows an example where the first sensor 21 serves as an active sensor and the second sensor 22 serves as a passive sensor. Alternatively, the first sensor 21 may serve as a passive sensor and the second sensor 22 may serve as an active sensor. Also in such an alternative embodiment, the coordinates of the object 50 can be calculated in a similar manner. In addition, in the present embodiment, coordinates of an object 50 can be calculated using any combination of adjacent sensors 21-24. As for the ranging sensors attached to the rear portion of the vehicle 30, coordinates of an object 50 rearward of the vehicle 30 can be calculated using any combination of adjacent sensors attached to the rear portion of the vehicle 30 in a similar manner.

Figure 3:
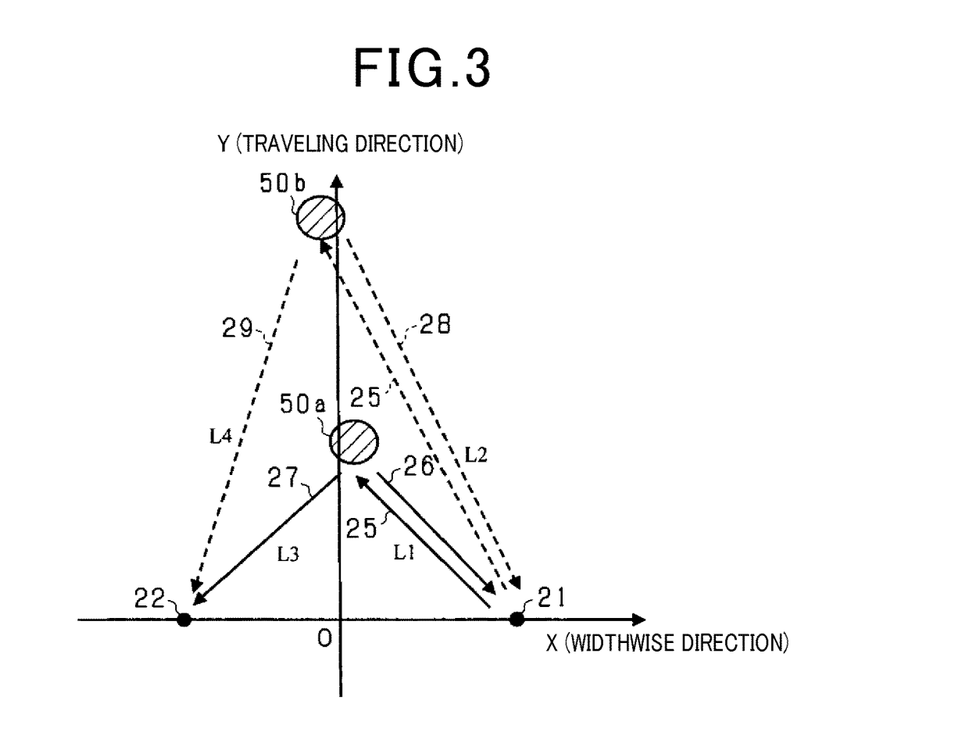
FIG. 3 is a schematic of calculating positions of two objects.

In some cases, two objects 50 may be present within an overlap of the ranges of object detection 40 of the first and second sensors 21, 22. FIG. 3 shows an example where a first object 50a and a second object 50b are present within an overlap (not shown) of the ranges of object detection 40 of the first and second sensors 21, 22. In FIG. 3, L1 is a first distance between the first sensor 21 and the first object 50a, L2 is a second distance between the first sensor 21 and a second object 50b, L3 is a third distance between the second sensor 22 and the first object 50a, and L4 is a fourth distance between the second sensor 22 and the second object 50b.

FIG. 3 shows an example where the second object 50b is farther away from the vehicle 30 than the first object 50a. The probe wave 25 is transmitted by the first sensor 21 and then reflected by the first and second objects 50a, 50b. In the present embodiment, a reflection of the probe wave 25 from the first object 50a incident on the first sensor 21 is referred to as a first direct wave 26, and a reflection of the probe wave 25 from the second object 50b subsequently incident on the first sensor 21 is referred to as a second direct wave 28. In addition, a reflection of the probe wave 25 from the first object 50a incident on the second sensor 22 is referred to as a first indirect wave 27, and a reflection of the probe wave 25 from the second object 50b subsequently incident on the second sensor 22 is referred to as a second indirect wave 29.

A propagation time of the first direct wave 26 is proportional to the first distance L1, and a propagation time of the second direct wave 28 is proportional to the second distance L2. Therefore, a difference between incident times of the first direct wave 26 and the second direct wave 28 is proportional to a difference between the first distance L1 and the second distance L2. Similarly, a propagation time of the first indirect wave 27 is proportional to a sum of the first distance L1 and the third distance L3, and a propagation time of the second indirect wave 29 is proportional to a sum of the second distance L2 and the fourth distance L4. Therefore, a difference between incident times of the first indirect wave 27 and the second indirect wave 29 is proportional to a difference between the sum of the first distance L1 and the third distance L3 and the sum of the second distance L2 and the fourth distance L4.

To calculate (relative) positions of the two objects 50a, 50b according to the principle of triangulation, any combination of one of the first direct wave 26 and the second direct wave 28 and one of the first indirect wave 27 and the second indirect wave 29 for which the triangulation calculation is feasible may be used.

X- and Y-coordinates of one of intersections of a circle of radius of the first distance L1 centered at the first sensor 21 and a circle of radius of the third distance L3 centered at the second sensor 22 are calculated as a position of the first object 50a, where the one of intersections of the circles resides in an upper half-plane defined by a region of $Y>=0$. Similarly, X- and Y-coordinates of one of intersections of a circle of radius of the second distance L2 centered at the first sensor 21 and a circle of radius of the fourth distance L4 centered at the second sensor 22 are calculated as a position of the second object 50b, where the one of intersections of the circles resides in the upper half-plane. For a large distance between the first object 50a and the second object 50b, there may be no intersections of the circle of radius of the first distance L1 centered at the first sensor 21 and a circle of radius of a sum of the second distance L2 and the fourth distance L4 subtracted by the first distance L1. That is, in such a case, the triangulation calculation is infeasible for a combination of the first direct wave 26 and the second indirect wave 29. Similarly, there may be no intersections of the circle of radius of the second distance L2 centered at the first sensor 21 and a circle of radius of a sum of the first distance L1 and the third distance L3 subtracted by the second distance L2. That is, the triangulation calculation is infeasible for a combination of the second direct wave 28 and the first indirect wave 27.

However, for some distances between the first object 50a and the second object 50b, as well as the triangulation calculation for the combination of the first direct wave 26 and the first indirect wave 27 and the triangulation calculation for the combination of the second direct wave 28 and the second indirect wave 29, the triangulation calculation for the combination of the first direct wave 26 and the second indirect wave 29 and the triangulation calculation for the combination of the second direct wave 28 and the first indirect wave 27, may be simultaneously established.

Figure 4:
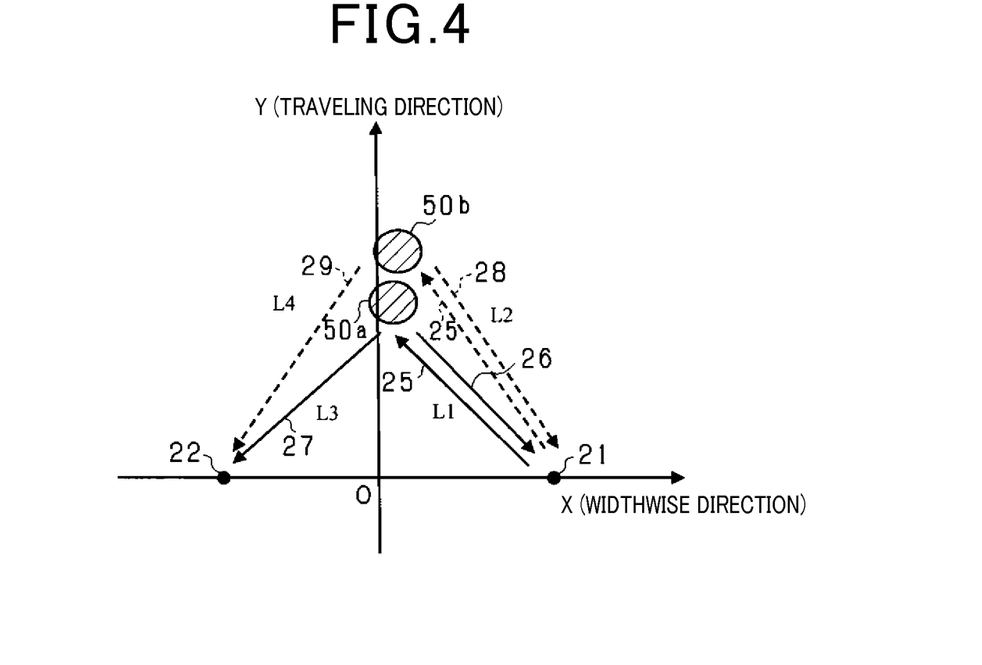
FIG. 4 is an example where two objects are in proximity.
Figure 5:
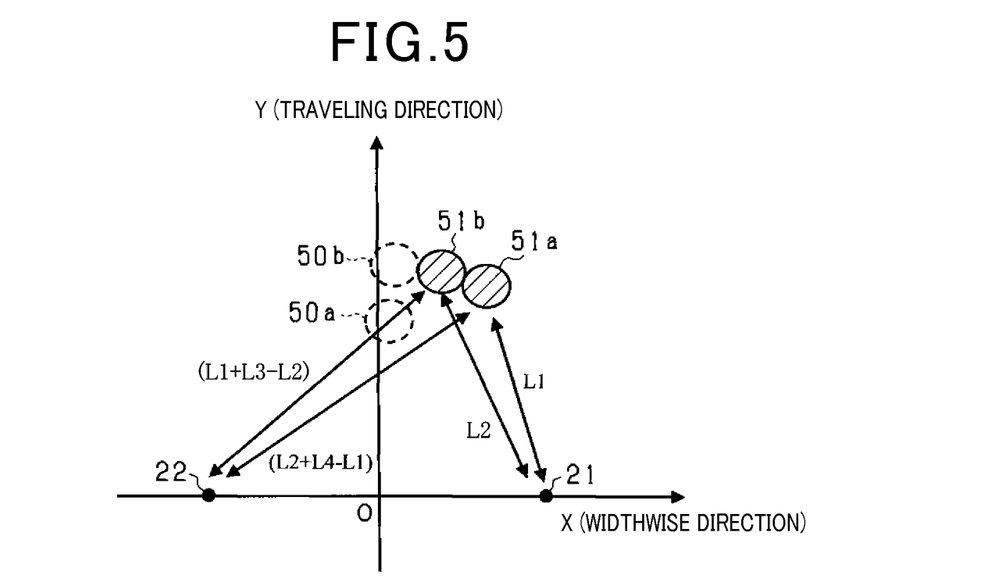
FIG. 5 is an example where positions of ghosts are calculated when two real objects are in proximity.

FIG. 4 shows an example where the first object 50a and the second object 50b that are actually existent are in proximity (to each other). FIG. 5 shows a position of an object 51a obtained by the triangulation calculation for the combination of the first direct wave 26 and the second indirect wave 29 and a position of an object 51b obtained by the triangulation calculation for the combination of the second direct wave 28 and the first indirect wave 27. Although each of the objects 51a, 51b is an actually non-existent object, the position of it can be obtained because the triangulation calculation is feasible. Such a non-existent object is referred to as a "ghost".

Thus, in the FIG. 5, the positions of the ghosts 51*a*, 51*b* that are actually non-existent objects are calculated by the triangulation calculations. More specifically, when the first object 50*a* and the second object 50*b* are in proximity, there may be intersections of the circle of radius of the first distance L1 centered at the first sensor 21 and the circle of radius of a sum of the second distance L2 and the fourth distance L4 subtracted by the first distance L1 centered at the second sensor 22. The one of the intersections which resides in the upper half-plane provides coordinates of the position of the ghost 51*a*. Similarly, there may intersections of the circle of radius of the second distance L2 centered at the first sensor 21 and the circle of radius of a sum of the first distance L1 and the third distance L3 subtracted by the second distance L2 centered at the second sensor 22. The one of the intersections which resides in the upper half-plane provides coordinates of the position of the ghost 51*b*.

FIG. 5 shows the first ghost 51*a* and the second ghost 51*b* calculated as above that respectively correspond to the first and second objects 50*a*, 50*b*.

If positions of the ghosts are calculated, it is impossible to discriminate between the ghosts or the actually existent objects. That is, it cannot be determined whether positions of the first and second objects 50*a*, 50*b* respectively calculated for the combination of the first direct wave 26 and the first indirect wave 27 and for the combination of the second direct wave 28 and the second indirect wave 29 or positions of the first and second ghosts 51*a*, 51*b* respectively calculated for the combination of the first direct wave 26 and the second indirect wave 29 and for the combination of the second direct wave 28 and the first indirect wave 27 are correct.

Meanwhile, if the positions of the first ghost 51*a* and the second ghost 51*b* are calculated, it is likely that the first object 50*a* and the second object 50*b* are in proximity. Thus, if the vehicle 30 does not interact with the first object 50*a* closest to the vehicle 30, the vehicle 30 is also less likely to interact with the second object 50*b*. Therefore, using the position of the first object 50*a* closest to the vehicle 30 calculated for the combination of the first direct wave 26 and the first indirect wave 27, it is determined whether the vehicle 30 is likely to interact with the first object 50*a*. The vehicle-object interaction avoidance control will be performed in response to the determination.

Figure 1B:
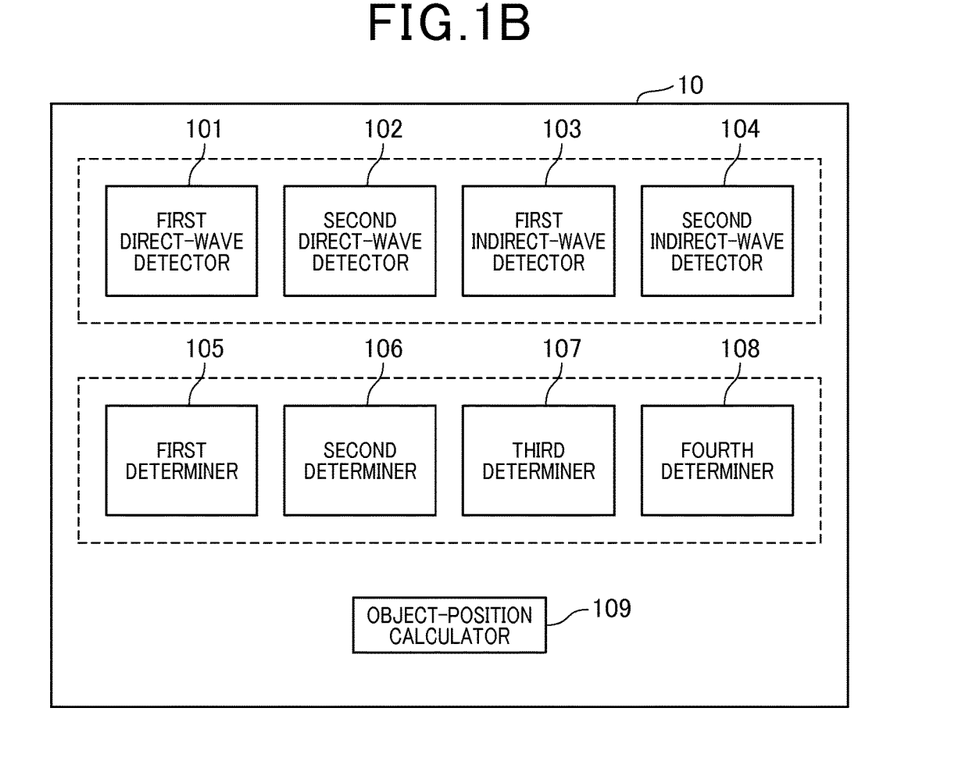
FIG. 1B is a functional block diagram of an electronic control unit of the object detection system.
Figure 6:
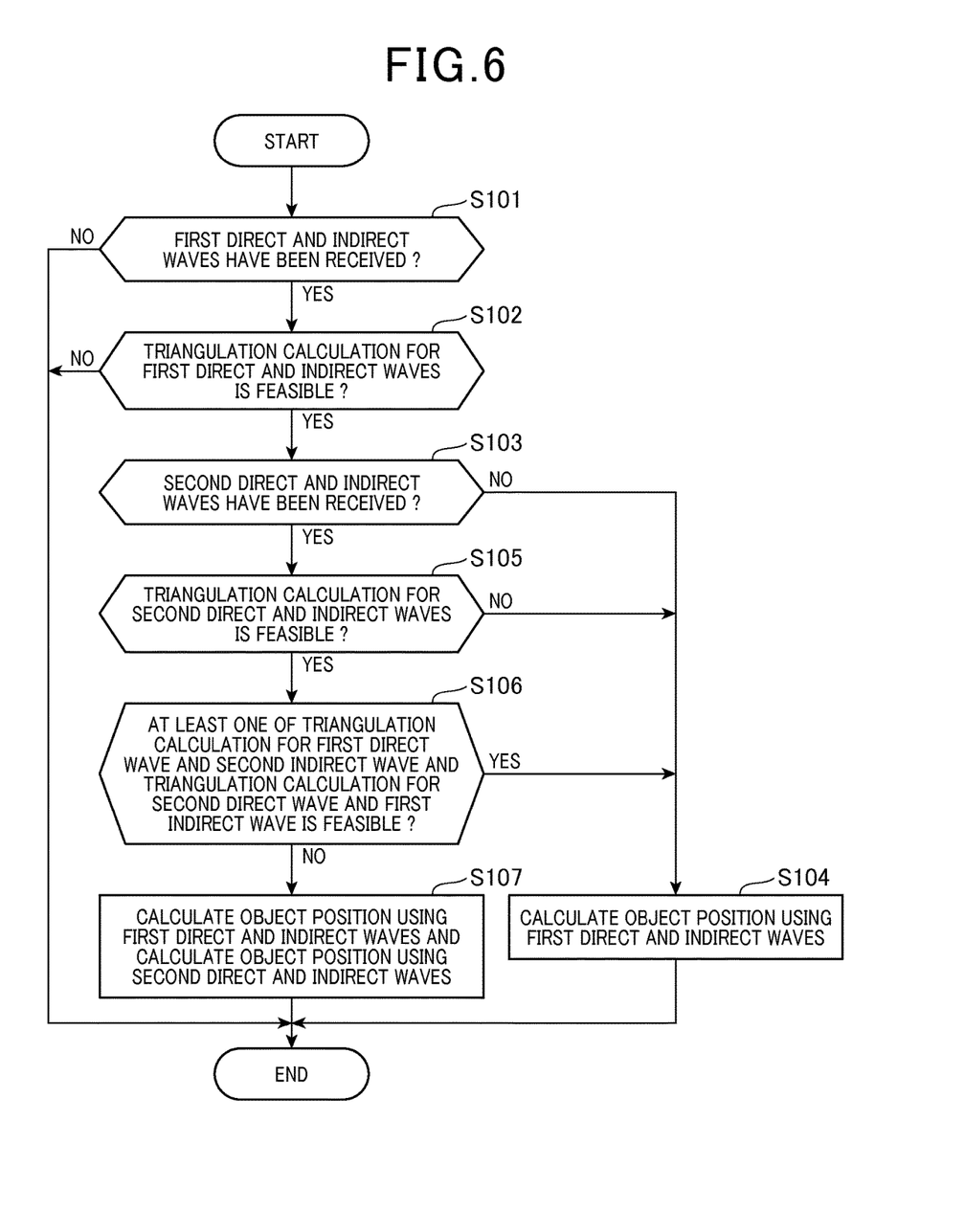
FIG. 6 is a flowchart of a process performed in the electronic control unit.

FIG. 6 is a flowchart of a process performed by the ECU 10 which corresponds to the object detection apparatus of the present embodiment. This process of FIG. 6 is commenced after transmission of the probe wave. FIG. 1B shows a functional block diagram of the ECU 10. As shown in FIG. 1B, the ECU 10 includes first and second direct-wave detectors 101, 102, first and second indirect-wave detectors 103, 104, first to fourth determiners 105-108, and an object-position calculator 109. Functions of these functional blocks may be implemented by the CPU executing various programs stored in the ROM or the like. The functions of them will be described later.

First, in step S101, the first direct-wave detector 101 determines whether or not the first direct wave 26 has been received, and the first indirect-wave detector 103 determines whether or not the first indirect wave 27 has been received. If at least one of the first direct wave 26 and the first indirect wave 27 has not been received, the triangulation is infeasible or cannot be performed. Therefore, the process ends.

If in step S101 it is determined that both the first direct wave 26 and the first indirect wave 27 have been received, then in step S102 the first determiner 105 determines whether or not the triangulation calculation for the combination of the first direct wave 26 and the first indirect wave 27 (providing a first object position) is feasible. The triangulation calculation using reflections from objects at different positions may fail. Therefore, if in step S102 it is determined that the triangulation calculation for the combination of the first direct wave 26 and the first indirect wave 27 is infeasible, it is likely that an object from which the first direct wave 26 has been reflected and an object from which the first indirect wave 27 has been reflected are different, and positions of these different objects cannot be calculated. Therefore, the process ends without further calculation.

If in step S102 it is determined that the triangulation calculation for the combination of the first direct wave 26 and the first indirect wave 27 is feasible, then in step S103 the second direct-wave detector 102 determines whether or not the second direct wave 28 has been received, and the second indirect-wave detector 104 determines whether or not the second indirect wave 29 has been received.

If only the second direct wave 28 has been received, as well as the triangulation calculation for the combination of the first direct wave 26 and the first indirect wave 27, the triangulation calculation for the combination of the second direct wave 28 and the first indirect wave 27 may be feasible when the object from which the first direct wave 26 has been reflected and the object from which the second direct wave 28 has been reflected are in proximity. However, it is impossible to determine whether the first indirect wave 27 has been reflected from the object from which the first direct wave 26 has been reflected or the object from which the second direct wave 28 has been reflected. That is, the triangulation calculation for the combination of the second direct wave 28 and the first indirect wave 27 may provide a position of a ghost that is an actually non-existent object. In addition, it is likely that the object from which the first direct wave 26 has been reflected is closer to the vehicle 30 than the object from which the second direct wave 28 has been reflected. On the other hand, if only the second indirect wave 29 has been received, as well as the triangulation calculation for the combination of the first indirect wave 27 and the first direct wave 26, the triangulation calculation for the combination of the second indirect wave 29 and the first direct wave 26 may be feasible when the object from which the first indirect wave 27 has been reflected and the object from which the second indirect wave 29 has been reflected are in proximity. However, it is impossible to determine whether the first direct wave 26 has been reflected from the object from which the first indirect wave 27 has been reflected or the object from which the second indirect wave 29 has been reflected. That is, the triangulation calculation for the combination of the second indirect wave 29 and the first direct wave 26 may provide a position of a ghost that is an actually non-existent object. In addition, it is likely that the object from which the first indirect direct wave 27 has been reflected is closer to the vehicle 30 than the object from which the second indirect wave 29 has been reflected. Therefore, if either or none of the second direct wave 28 and the second indirect wave 29 has been received, then in step S104 the first determiner 105 calculates a position of the first object 50*a* using the first direct wave 26 and the first indirect wave 27. Thereafter, the process ends.

If in step S103 it is determined that both the second direct wave 28 and the second indirect wave 29 have been received, then in step S105 the second determiner 106 determines whether or not the triangulation calculation for the combination of the second direct wave 28 and the second indirect wave 29 (providing a second object position) can be established. If in step S105 it is determined that the triangulation calculation for the combination of the second direct wave 28 and the second indirect wave 29 is infeasible, then it is likely that the object from which the second direct wave 28 has been reflected and the object from which the second indirect wave 29 has been reflected are different, so that positions of them are unable to be calculated. In addition, if at least one of the triangulation calculation for the combination of the second direct wave 28 and the first indirect wave 27 and the triangulation calculation for the combination of the second indirect wave 29 and the first direct wave 26 is feasible, it is impossible to determine which combination of direct and indirect waves (among the combination of the first direct wave 26 and the first indirect wave 27, the combination of the first direct wave 26 and the second indirect wave 29, the combination of the second direct wave 28 and the first indirect wave 27, and the combination of the second direct wave 28 and the second indirect wave 29) can provide a correct object position since the triangulation calculation for the combination of the first direct wave 26 and the first indirect wave 27 is also feasible. Therefore, the second direct wave 28 and the second indirect wave 29 are not used to determine an object position (a position of an object). That is, only the triangulation calculation for the combination of the first direct wave 26 and the first indirect wave 27 is used to determine the object position. In step S104, the object-position calculator 109 calculates the object position using the first direct wave 26 and the first indirect wave 27. Thereafter, the process ends.

If in step S105 it is determined that the triangulation calculation for the combination of the second direct wave 28 and the second indirect wave 29 is feasible, then in step S106 it is determined whether at least one of the triangulation calculation for the combination of the second direct wave 28 and the first indirect wave 27 and the triangulation calculation for the combination of the second indirect wave 29 and the first direct wave 26 is feasible. More specifically, in step S106, the third determiner 107 determines whether the triangulation calculation for the combination of the second direct wave 28 and the first indirect wave 27 (providing a third object position) is feasible, and the fourth determiner 108 determines whether the triangulation calculation for the combination of the first direct wave 26 and the second indirect wave 29 (providing a fourth object position) is feasible. As shown in FIG. 5, when the first object 50*a* and the second object 50*b* are in proximity, not only the triangulation calculation for the combination of the first direct wave 26 and the first indirect wave 27 and the triangulation calculation for the combination of the second direct wave 28 and the second indirect wave 29, but also at least one of the triangulation calculation for the combination of the first direct wave 26 and the second indirect wave 29 and the triangulation calculation for the combination of the second direct wave 28 and the first indirect wave 27, may be feasible. Therefore, it is impossible to determine which combination of direct and indirect waves can provide a correct object position.

In step S104, assuming that there are two objects in proximity or a single object from which the first direct wave 26, first indirect wave 27, second direct wave 28, second indirect wave 29 have been reflected, the object-position calculator 109 calculates a position of the object closest to the vehicle 30 using the first direct wave 26 and the first indirect wave 27.

If in step 106 it is determined none of the triangulation calculation for the combination of the first direct wave 26 and the second indirect wave 29 and the triangulation calculation for the combination of the second direct wave 28 and the first indirect wave 27 are infeasible, then in step S107 the triangulation calculation for the combination of the first direct wave 26 and the first indirect wave 27 and the triangulation calculation for the combination of the second direct wave 28 and the second indirect wave 29 are performed to provide two different object positions. More specifically, the object-position calculator 109 calculates the position of the first object 50*a* using the first direct wave 26 and the first indirect wave 27, and calculates the position of the second object 50*b* using the second direct wave 28 and the second indirect wave 29. Thereafter, the process ends.

After the process ends, the vehicle-object interaction avoidance control of the vehicle 30 is performed based on the calculated positions of the first object 50*a* and the second object 50*b*.

Although in the present embodiment the above process has been described as being performed based on the detections of the ranging sensors 21, 22. Practically, the above process is performed for each combination of adjacent sensors (active and passive sensors) among the ranging sensors 21-24.

The object detection apparatus of the present embodiment configured as above can provide the following advantages.

When the positions of the first object 50*a* and the second object 50*b* are calculated using pairwise combinations of direct and indirect waves selected from the first direct wave 26, the first indirect wave 27, the second direct wave 28, and the second indirect wave 29, the triangulation calculations for incorrect combinations of direct and indirect waves will provide positions of actually non-existent objects (i.e. ghosts). Controls of the braking device of the vehicle 30 in response to the presence of the ghosts are undesirable. On the other hand, if a calculated object position is not in a traveling path of the vehicle 30 despite that an object is actually present in the traveling path, the vehicle-object interaction avoidance control will not be performed, which could lead to interaction of the vehicle 30 with the object.

With the above configuration, in the presence of the second object 50*b* farther away from the vehicle 30 than the first object 50*a*, the position of the second object 50*b* can be calculated using the second direct wave 28 and the second indirect wave 29. Further, positions of objects are calculated using combinations of direct and indirect waves other than combinations of direct and indirect waves for which the triangulation calculations may provide positions of actually non-existent objects (i.e., ghosts). This allows positions of actually existent objects to be calculated accurately without misdetecting positions of actually non-existent objects. In addition, in the presence of a plurality of combinations of direct and indirect waves selected from the first direct wave 26, the first indirect wave 27, the second direct wave 28, and the second indirect wave 29, for which combinations the triangulation calculations provide positions of objects that are not discriminable between actually existent and non-existent objects, the position of the object closest to the vehicle 30 is calculated using the combination of the first direct wave 26 and the first indirect wave 27. Therefore, situations where a position of the object that is likely to interact with the vehicle 30 is left undetected can be avoided.

(Modifications)

(i) In the above embodiment, the positions of the first object 50*a* and the second object 50*b* are detected. Alternatively, in addition to the positions of the first object 50*a* and the second object 50*b*, a position of a third object that is farther away from the vehicle 30 than the second object 50*b* may be calculated using third direct and indirect waves as reflections from the third object. The third direct wave is incident on the sensor 21 subsequently to the first and second direct waves 26, 28, and the third indirect wave is incident on the sensor 22 subsequently to the first and second indirect waves 27, 29.

As in the above embodiment, it may be determined whether or not the triangulation calculation using the third direct and indirect waves is feasible. Subsequently, it is determined whether or not both the triangulation calculation using one of the first and the second direct waves and the third indirect wave and the triangulation calculation using one of the first and second indirect waves and the third direct wave are feasible. If it is determined that at least one of the triangulation calculation using one of the first and the second direct waves and the third indirect wave and the triangulation calculation using one of the first and second indirect waves and the third direct wave is feasible, the third object, as with the second object, may be assumed to be in proximity to one of the first object 50a and the second object 50b, and it cannot be determined that the position of the third object can be correctly calculated using which combination of direct and indirect waves selected from the first to third direct waves and the first to third indirect waves. Therefore, in such cases, the triangulation calculation using the third direct and indirect waves is not performed.

In further embodiments where a position of an n-th (n being an integer equal to or greater than four) object that is farther away from the vehicle 30 than the first to (n−1)-th objects is calculated using n-th direct and indirect waves as reflections from the n-th object. It may be determined whether or not the triangulation calculation using the n-th direct and indirect waves is feasible. If it is determined that the triangulation calculation using the n-th direct and indirect waves is feasible, then it may be determined whether or not at least one of the triangulation calculation using one of the first to (n−1)-th direct waves and the n-th indirect wave and the triangulation calculation using one of the first to (n−1)-th indirect waves and the n-th direct wave is feasible. If it is determined that at least one of the triangulation calculation using one of the first to (n−1)-th direct waves and the n-th indirect wave and the triangulation calculation using one of the first to (n−1)-th indirect waves and the n-th direct wave is feasible, the n-th object may be assumed to be in proximity to at least one of the first to (n−1)-th objects, and it cannot be determined the position of the n-th object can be correctly calculated using which combination of direct and indirect waves selected from the first to n-th direct waves and the first to n-th indirect waves. Therefore, in such cases, the triangulation calculation using the n-th direct and indirect waves is not performed.

(ii) In the above embodiment, the probe wave is an ultrasonic wave. Alternatively, the probe wave may be an arbitrary probe wave other than the ultrasonic wave, such as a sound wave, a radio wave or the like. That is, the probe wave may be an arbitrary oscillating wave having a predetermined amplitude.

(iii) In the above embodiment, it is determined only whether or not the triangulation calculation is feasible. Alternatively, if it is determined that the triangulation calculation is feasible, then it may be determined whether or not the calculated position of the object is within the overlap of the ranges of object detection 40 as shown in FIG. 1A. If it is determined that the calculated position of the object is out of the overlap of the ranges of object detection 40, then it may be determined that the object is a ghost that is an actually non-existent object.

(iv) In the above embodiment, the object detection apparatus is mounted in the vehicle 30. Alternatively, the object detection apparatus may be mounted in a moving object other than the vehicle, such as an airplane, a ship, a robot or the like. Still alternatively, the object detection apparatus may be mounted in a fixed object and is used to measure a distance between the fixed object and an object around the fixed object. This is advantageous because even when the apparatus is mounted in the fixed object, multiple reflections between the fixed object and objects around the fixed object may occur. Yet still alternatively, the object detection apparatus may be carried on and by a person to warn the person about an object approaching the person.

What is claimed is:

1. An object detection apparatus for detecting one or more objects around the apparatus by transmitting a probe wave and receiving reflections of the probe wave from the one or more objects, the apparatus comprising:
   a transmitter configured to transmit a probe wave;
   two or more sensors configured to receive reflections of the probe wave transmitted by the transmitter; and
   a computer system including a central processing unit (CPU), the computer system being configured to provide:
   a first direct-wave detector configured to determine whether or not a first direct wave has been received as a reflection of the probe wave at a first sensor location where the probe wave is transmitted;
   a second direct-wave detector configured to determine whether or not a second direct wave has been received as a reflection of the probe wave at the first sensor location at a time later than the receipt time of the first direct wave;
   a first indirect-wave detector configured to determine whether or not a first indirect wave has been received as a reflection of the probe wave at a second sensor location that is away from the first sensor location;
   a second indirect-wave detector configured to determine whether or not a second indirect wave has been received as a reflection of the probe wave at the second sensor location at a time later than the receipt time of the first indirect wave;
   a first determiner configured to determine whether or not a first object position can be calculated using a combination of the first direct wave and the first indirect wave, the first object position being a closest possible position of the one or more objects;
   a second determiner configured to determine whether or not a second object position can be calculated using a combination of the second direct wave and the second indirect wave;
   a third determiner configured to determine whether or not a third object position can be calculated using a combination of the second direct wave and the first indirect wave;
   a fourth determiner configured to determine whether or not a fourth object position can be calculated using a combination of the first direct wave and the second indirect wave; and
   an object-position calculator configured to, in response to determining, based on the determinations of the first to fourth determiners, that both the first and second object positions can be calculated and at least one of the third and fourth object positions can be calculated, calculate only the first object position using the first direct wave, identified as having an earliest reception time at the first sensor location, and the first indirect wave, identified as having an earliest reception time at the second sensor location, wherein, based on the calculated first object position, the object-position calculator is configured to output a signal configured to perform a vehicle-object interaction avoidance control.

2. The apparatus of claim 1, wherein the object-position calculator is configured to, if it is determined from the determinations of the first to fourth determiners that both the first and second object positions can be calculated and none of the third and fourth object positions can be calculated, calculate the first object position using the first direct wave and the first indirect wave and further calculate the second object position using the second direct wave and the second indirect wave.

3. The apparatus of claim 1, wherein the probe wave is an ultrasonic wave.

4. The apparatus of claim 1, wherein the object detection apparatus for detecting one or more objects is mounted in a vehicle.

5. The apparatus of claim 1, wherein the first, second, third and fourth determiners determine whether or not the first, second, third and fourth object positions, respectively, can be calculated, using triangulation.

6. The apparatus of claim 1, wherein the vehicle-object interaction avoidance control is a steering angle control, a deceleration control, or an alarm notification.

\* \* \* \* \*